(12) United States Patent
Worsham, II et al.

(10) Patent No.: US 11,048,273 B2
(45) Date of Patent: Jun. 29, 2021

(54) SYSTEM AND METHOD FOR ROTORCRAFT HEIGHT CONTROL

(71) Applicant: Textron Innovations Inc., Providence, RI (US)

(72) Inventors: Robert Earl Worsham, II, Weatherford, TX (US); Christopher Mike Bothwell, Grapevine, TX (US); Sung Kyun Kim, Bedford, TX (US); Morganne Cody Klein, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 228 days.

(21) Appl. No.: 16/004,254

(22) Filed: Jun. 8, 2018

(65) Prior Publication Data

US 2019/0377366 A1    Dec. 12, 2019

(51) Int. Cl.
| | | |
|---|---|---|
| G05D 1/08 | (2006.01) |
| B64C 27/00 | (2006.01) |
| B64D 31/06 | (2006.01) |
| G05D 1/00 | (2006.01) |
| G05D 1/06 | (2006.01) |

(52) U.S. Cl.
CPC ......... G05D 1/0816 (2013.01); B64C 27/006 (2013.01); B64D 31/06 (2013.01); G05D 1/0066 (2013.01); G05D 1/0607 (2013.01)

(58) Field of Classification Search
CPC .. G05D 1/0816; G05D 1/0066; G05D 1/0607; B64C 27/006; B64D 31/06
See application file for complete search history.

(56) References Cited

U.S. PATENT DOCUMENTS

| | | | | |
|---|---|---|---|---|
| 2010/0168939 A1* | 7/2010 | Doeppner | ............ | G05D 1/0676 701/16 |
| 2010/0305785 A1* | 12/2010 | Faurie | ................. | G05D 1/0061 701/9 |
| 2011/0199253 A1* | 8/2011 | Delga | .................... | G01C 5/005 342/120 |
| 2014/0172202 A1* | 6/2014 | Greene | ................. | B64D 31/06 701/4 |

(Continued)

FOREIGN PATENT DOCUMENTS

| | | |
|---|---|---|
| EP | 0601000 B1 | 1/1997 |
| JP | 2000247296 A | 9/2000 |

*Primary Examiner* — Thomas E Worden
(74) *Attorney, Agent, or Firm* — Slater Matsil, LLP

(57) ABSTRACT

A method of operating a rotorcraft includes receiving multiple first height data signals from multiple first height sensors on the rotorcraft, wherein the first height sensors measure height using a first technique, receiving multiple second height data signals from multiple second height sensors on the rotorcraft, wherein the second height sensors measure height using a second technique that is different than the first technique, determining a first height signal from the multiple first height data signals based on a selection scheme, determining a second height signal from the multiple second height data signals, selecting the first height signal or the second height signal to determine a selected height signal, and generating a flight control signal and controlling operation of the rotorcraft according to the flight control signal, the flight control signal based on the selected height signal.

20 Claims, 9 Drawing Sheets

(56) References Cited

U.S. PATENT DOCUMENTS

| | | | |
|---|---|---|---|
| 2016/0023759 A1* | 1/2016 | Barrett | B64C 27/20 |
| | | | 244/17.23 |
| 2018/0105269 A1* | 4/2018 | Yan | G05D 1/0607 |
| 2018/0170533 A1* | 6/2018 | Lee | B64C 1/08 |
| 2018/0257775 A1* | 9/2018 | Baek | B64C 27/20 |
| 2018/0274919 A1* | 9/2018 | Pan | G01C 5/06 |
| 2018/0312250 A1* | 11/2018 | Taheri | G05D 1/0858 |
| 2019/0047702 A1* | 2/2019 | Chen | B64D 27/24 |
| 2019/0094887 A1* | 3/2019 | Di | B64C 39/024 |
| 2019/0185149 A1* | 6/2019 | Pantalone | B64C 27/001 |
| 2019/0210737 A1* | 7/2019 | Enke | B64D 31/00 |
| 2019/0349076 A1* | 11/2019 | Li | G05D 1/0022 |

* cited by examiner

SYSTEM AND METHOD FOR ROTORCRAFT HEIGHT CONTROL

TECHNICAL FIELD

The present invention relates generally to a system and method for a flight control, and, in particular embodiments, to a system and method for height control of a rotorcraft.

BACKGROUND

Fly-by-wire systems in aircraft, as opposed to mechanically controlled systems, use electronic signals to control the flight surfaces and engines in the aircraft. For example, instead of having the pilot controls mechanically linked to the control surfaces via a hydraulic system, the pilot controls are electronically linked to a flight computer, which, in turn, controls flight surface actuators via electronic signals. By further interfacing the flight computer to aircraft sensors, sophisticated control algorithms may be used to provide autopilot functionality, as well as to stabilize and control the aircraft.

While fly-by-wire systems have become commonplace in commercial and civilian fixed wing aircraft, their adoption among rotorcraft, such as helicopters, has been much slower. However, by adopting fly-by-wire systems in helicopters, safer operation may be achieved in difficult flight environments such as low speed, low altitude, degraded visual environments and inclement weather. Another area in which fly-by-wire systems may benefit rotorcraft is in the reduction in pilot workload. By providing automated features such as stabilization in response to wind, control axis decoupling, position hold and heading hold functionality, the pilot is freed up to focus on the environment in which he or she flies.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
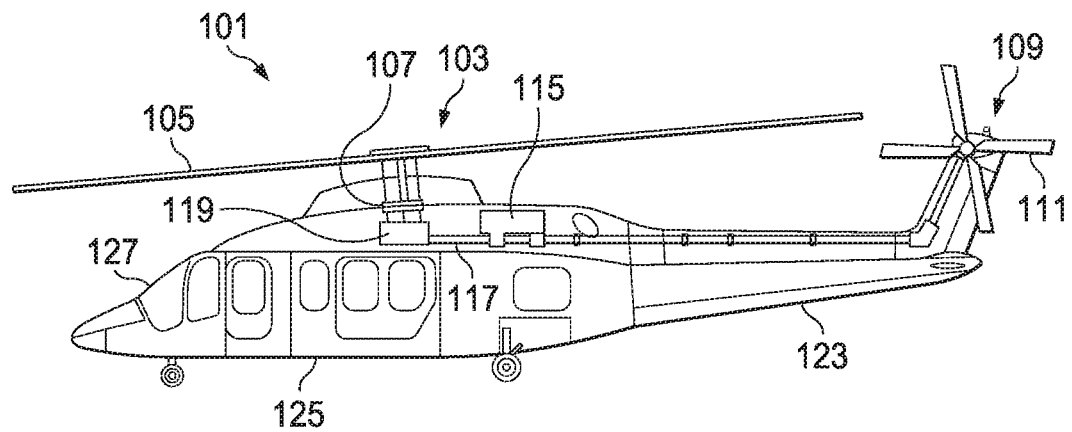
FIG. 1 illustrates an embodiment rotorcraft.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective causes increased power to the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system uses the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

One notable feature of a fly-by-wire rotorcraft is the ability of the rotorcraft to automatically hold or achieve a designated height (e.g., height above ground or altitude). Generally, a rotorcraft flight control system holds a height by monitoring the actual height of the rotorcraft, determining a difference between the actual height of the rotorcraft and a desired height of the rotorcraft, and adjusting actuators attached to the main rotor until the difference between the actual height of the rotorcraft and the desired height is minimized or reduced using feedback control. Thus, the ability to safely control the height of the rotorcraft relies, in part, in obtaining reliable height information. Embodiments of the present disclosure will be described with respect to a specific context, namely a system and method for the height control of a rotorcraft.

In some cases, a rotorcraft may have a Minimum Use Height (MUH) established for each flight mode (e.g., automatic height hold), which is the minimum height the flight mode may be used due to safety concerns. In some cases, the MUH for a flight mode may be determined as the minimum height the rotorcraft can be guaranteed to lose no more than half of its height above ground following a malfunction. Embodiments herein describe a height control system in a rotorcraft which may be allowed to be engaged at all heights down to touchdown rather than being allowed only above a specified MUH. For example, embodiments described herein allow for a height control system for which an automatic height control (e.g., a height hold mode) may be enabled over the full envelope of the rotorcraft (e.g., at all heights). To safely allow automatic height control, the height control system described herein uses a combination of multiple radio height sensors and multiple barometric height sensors to determine a height of the rotorcraft used as feedback during height control. Additionally, the height control system controls the flight control devices of the rotorcraft so the rotorcraft responds safely and in different ways depending on the current height, when experiencing changes in height, when one or more sensors fail, or in other conditions. In this manner, an automatic height control may be safely enabled at all heights.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control the flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize the flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2:
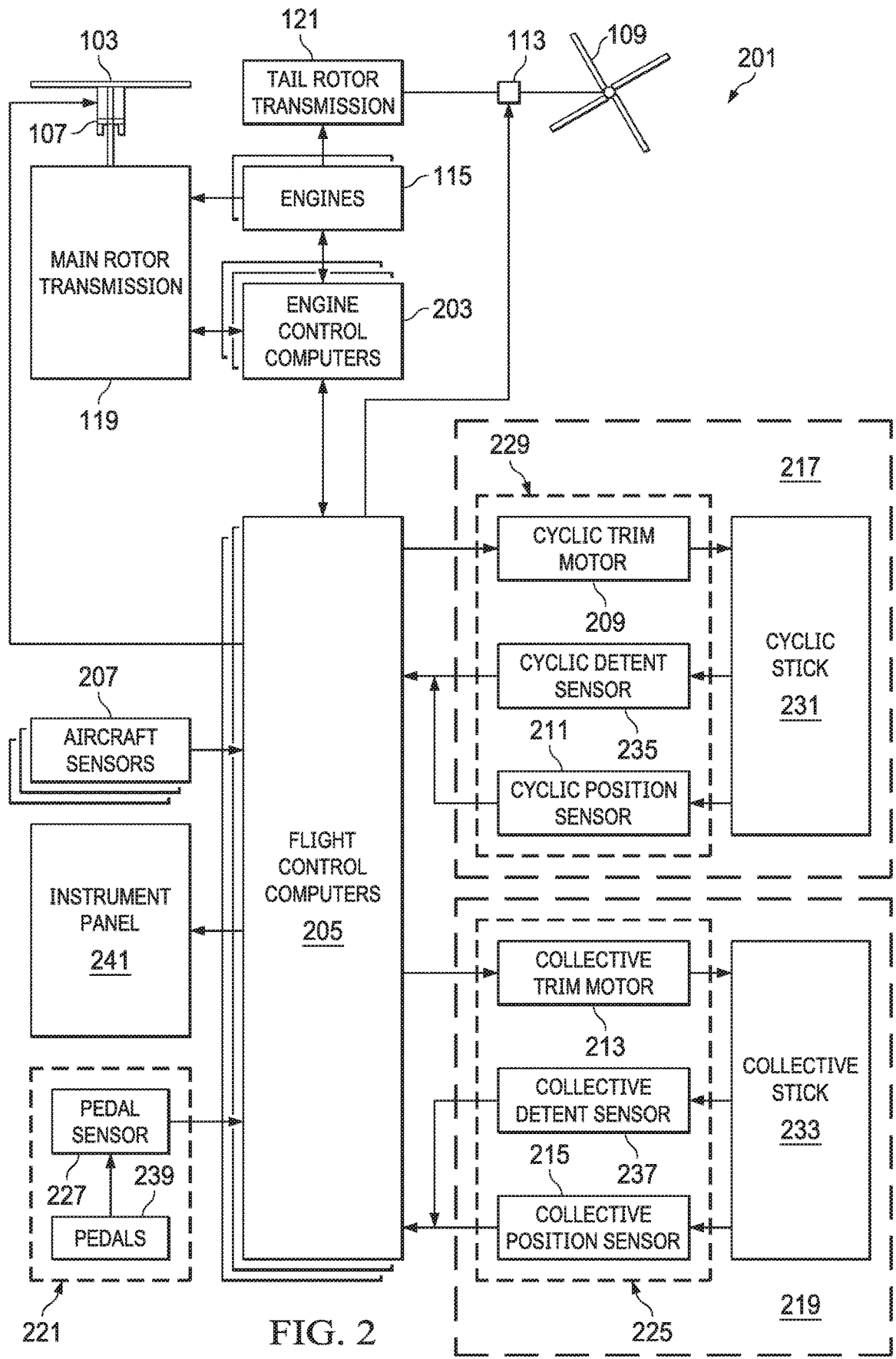
FIG. 2 illustrates a block diagram of an embodiment rotorcraft flight control system.

FIG. 2 illustrates a fly-by-wire flight control system 201 for a rotorcraft according to some embodiments. A pilot may manipulate one or more pilot flight controls in order to control the flight of the rotorcraft. The pilot flight controls may include manual controls such as a cyclic stick 231 in a cyclic control assembly 217, a collective stick 233 in a collective control assembly 219, and pedals 239 in a pedal assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce the workload of the flight crew, and the like. The flight control system 201 includes engine control computers (ECCUs) 203, flight control computers 205, and aircraft sensors 207, which collectively adjust the flight control devices.

The flight control system 201 has one or more flight control computers 205 (FCCs). In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such a measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. For example, the aircraft sensors 207 may include barometric altimeters for measuring altitude above sea level and radio altimeters for measuring height above ground. In some cases, radio altimeters may provide more consistent and stable height measurements, as radio altimeters are not affected by fluctuations in air pressure generated by wind gusts or rotor-induced turbulence. In some cases, multiple units of a type of sensor may be present for redundancy or error-checking.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic control stick 231. In some embodiments, the cyclic control stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic control stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective control stick 233 in the collective control assembly 219. In some embodiments, the collective control stick 233 is a single control stick that moves along a single axis or with a lever type action. A collective position sensor 215 detects the position of the collective control stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective control stick 233. Similar to the determination of the suggested cyclic stick position, in some embodiments, the FCCs 205 determine a suggested collective stick position for the collective control stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. The trim motors 209 and 213 may push the respective stick in a particular direction when the pilot is moving the stick to indicate a particular condition. Since the FBW system mechanically disconnects the stick from one or more flight control devices, a pilot may not feel a hard stop, vibration, or another tactile cue that would be inherent in a stick that is mechanically connected to a flight control assembly. In some embodiments, the FCCs 205 may cause the trim motors 209 and 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. These detent sensors 235, 237 detect motion and/or position of the respective control stick that is caused by pilot input, as opposed to motion and/or position caused by commands from the FCCs 205, rotorcraft vibration, and the like and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
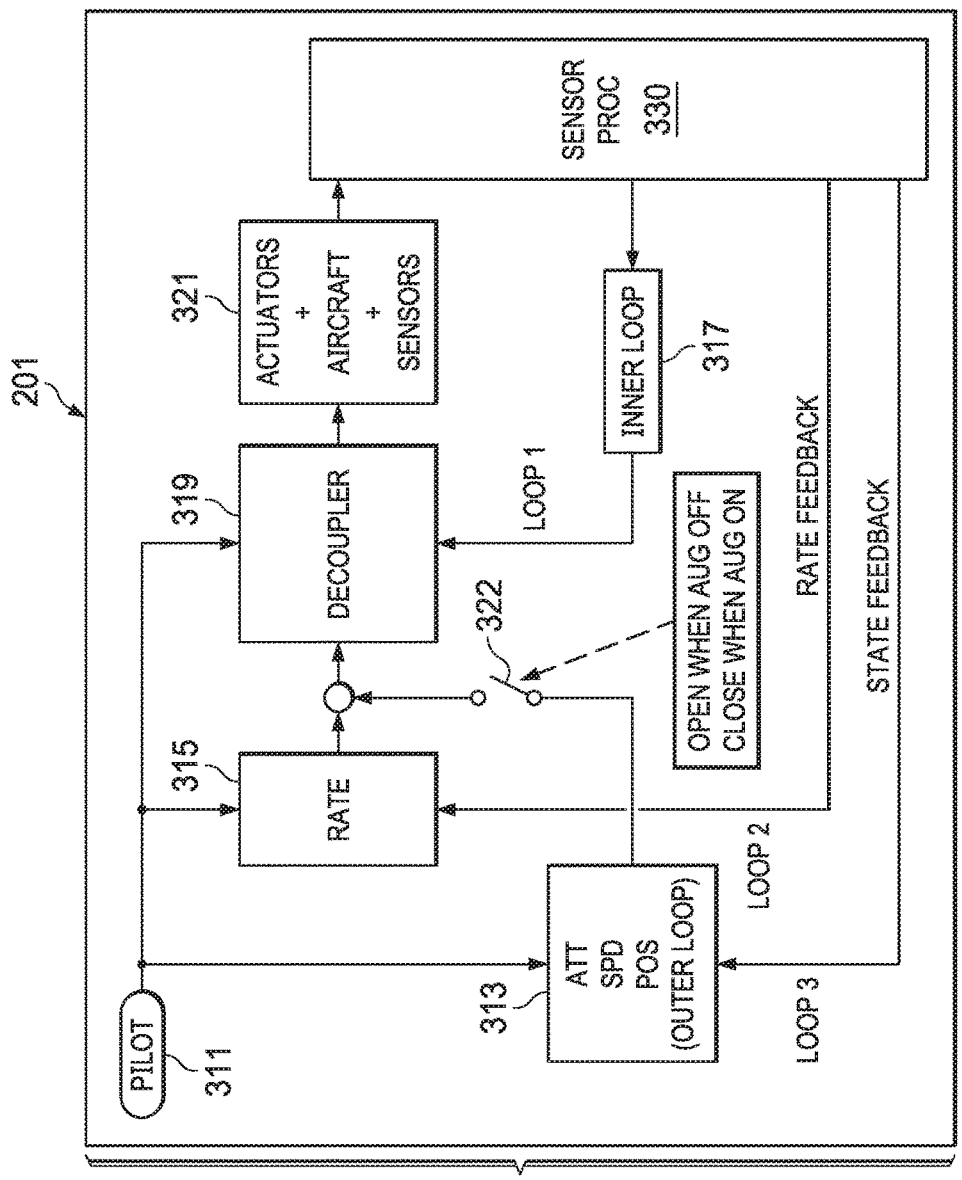
FIG. 3 illustrates a block diagram of an embodiment flight control system.
Figure 3:
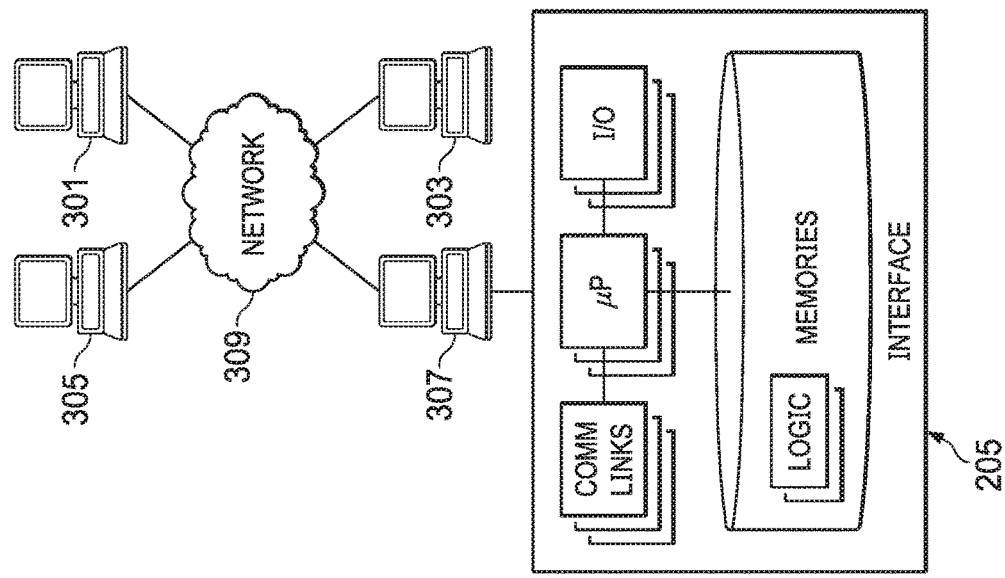

Moving now to the operational aspects of flight control system 201, FIG. 3 illustrates in a highly schematic fashion, a manner in which flight control system 201 may implement FBW functions as a series of interrelated feedback loops running certain control laws. FIG. 3 representatively illustrates a three-loop flight control system 201 according to an embodiment. In some embodiments, elements of the three-loop flight control system 201 may be implemented at least partially by FCCs 205. As shown in FIG. 3, however, all, some, or none of the components (301, 303, 305, 307) of three-loop flight control system 201 could be located external or remote from the rotorcraft 100 and communicate to on-board devices through a network connection 309.

The three-loop flight control system 201 of FIG. 3 has a pilot input 311, an outer loop 313, a rate (middle) loop 315, an inner loop 317, a decoupler 319, and aircraft equipment 321 (corresponding, e.g., to flight control devices such as swashplate 107, tail rotor transmission 212, etc., to actuators (not shown) driving the flight control devices, to sensors such as aircraft sensors 207, position sensors 211, 215, detent sensors 235, 237, etc., and the like).

In the example of FIG. 3, a three-loop design separates the inner stabilization and rate feedback loops from outer guidance and tracking loops. The control law structure primarily assigns the overall stabilization task and related tasks of reducing pilot workload to inner loop 317. Next, middle loop 315 provides rate augmentation. Outer loop 313 focuses on guidance and tracking tasks. Since inner loop 317 and rate loop 315 provide most of the stabilization, less control effort is required at the outer loop level. As representatively illustrated in FIG. 3, a switch 322 may be provided to turn outer loop flight augmentation on and off, as the tasks of outer loop 313 are not necessary for flight stabilization.

In some embodiments, the inner loop 317 and rate loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. In accordance with some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain. In some embodiments, data produced by sensors within aircraft equipment 321 are conditioned by sensor processing block 330. Sensor processing block may reformat and rescale data to make the sensor data compatible with flight control algorithms, provide dynamic pre-filtering of the sensor signals, or perform other data processing operations.

Figure 4:
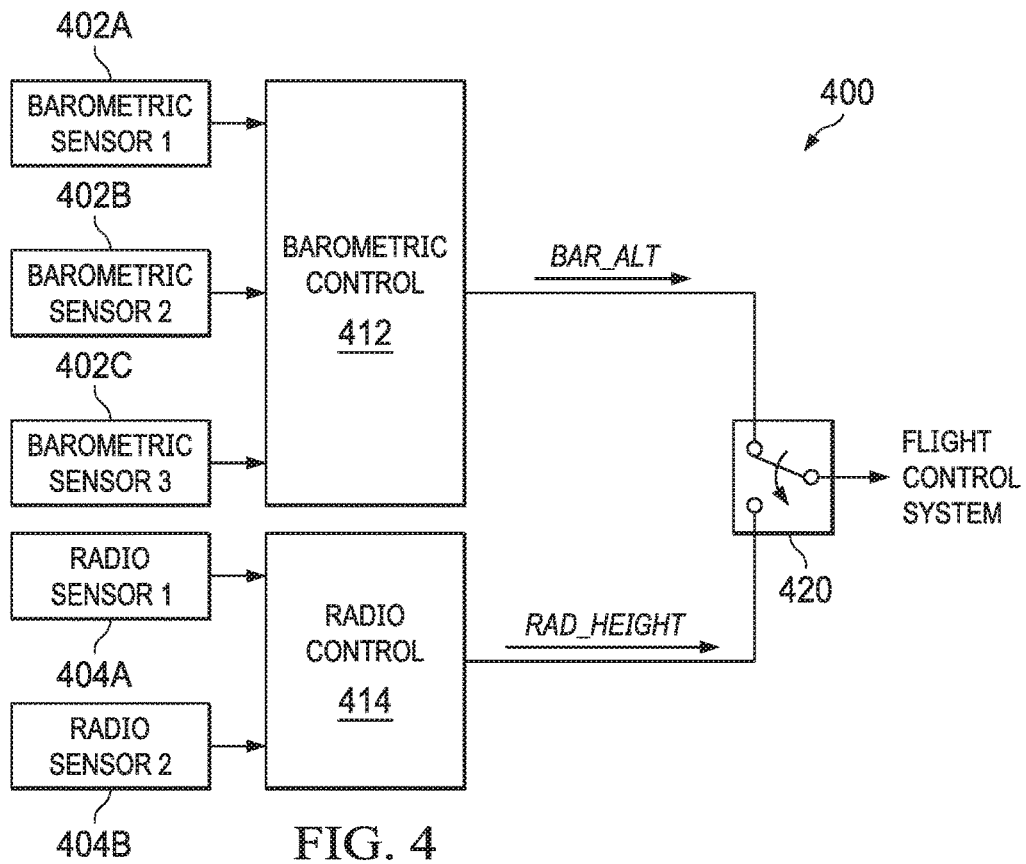
FIG. 4 illustrates a block diagram of an embodiment height control system.

FIG. 4 illustrates a height control system 400 that may be implemented in flight control system 201. The height control system 400 includes multiple barometric altimeter sensors 402A-C coupled to a barometric control 412, multiple radio height sensors 404A-B coupled to a radio control 414, and a selection control 420. The height control system 400 shown in FIG. 4 includes three barometric sensors 402A-C (i.e., a triplex system) and two radio sensors 404A-B (i.e., a duplex system), but other embodiments may include other numbers of sensors. The barometric sensors 402A-C each provide barometric altitude measurements and other data to the barometric control 412. The barometric control 412, in turn, generates a measurement of altitude (represented as "BAR_ALT") that may be used by the flight control system 201. In general, barometric altitude sensors use measurements of atmospheric pressure to determine a height above sea level (i.e., the rotorcraft's altitude). However, barometric altitude sensors may be sensitive to fluctuations in air pressure, turbulence produced by the rotorcraft itself, or other factors that generate inaccuracies. Additionally, barometric altitude sensors may not indicate changes in terrain, the presence of structures beneath the rotorcraft, etc. As such, in some cases the barometric altitude sensors 402A-C may be most safely used by the flight control system 201 at higher altitudes for which inaccuracies are less of a concern. In some cases, multiple redundant barometric altitude sensors may be used to reduce the chance of problems due to sensor failure.

The radio sensors 404A-B provide radio height measurements and other data to the radio control 414. The radio control 414, in turn, generates a measurement of height (represented as "RAD_HEIGHT") that may be used by the flight control system 201. In general, radio height sensors use radio waves reflected off surfaces beneath the rotorcraft to determine the distance of the rotorcraft above those surfaces (i.e., the rotorcraft's height). Radio height sensors are not affected by fluctuations in air pressure, and thus may provide measurements less prone to environmental conditions. However, radio height sensors are less effective as the height increases, as the reflected radio waves have less intensity. As such, in some cases the radio height sensors 404A-B may be most safely used by the flight control system 201 at lower heights. Additionally, multiple redundant radio height sensors may be used to reduce the chance of problems due to sensor failure. However, the number of redundant radio height sensors may be limited by available space, cost, or other factors. As such, the number of barometric altitude sensors may be greater than the number of radio height sensors, and thus height control system 400 may use only barometric altitude sensors for some cases in which one or more radio height sensors are failing.

In some embodiments, the barometric control 412 or radio control 414 may provide other information to flight control system 201, such as information related to sensor failure, data mismatch, or other information. For example, a processor or circuitry of a sensor may detect a malfunction and transmit a signal that indicates failure. In some embodiments, portions of height control system 400 such as the barometric control 412, the radio control 414, or the selection control 420 may be implemented in sensor processing block 330, and barometric sensors 402A-C and radio sensors 404A-B may be part of aircraft equipment 321. Alternatively, portions of height control system 400 may be implemented in outer loop 313.

Whether BAR_ALT or RAD_HEIGHT is used by the flight control system 201 is determined by selection control 420. The selection control 420 may, for example, select BAR_ALT above a certain threshold height and select RAD_HEIGHT at or below the threshold height. The threshold height may be predetermined (e.g., 100 feet above ground or another height), or may depend on flight conditions of the rotorcraft. In some cases, the height threshold may have hysteresis such that a first threshold height is used when currently using RAD_HEIGHT and a second threshold height is used when currently using BAR_ALT.

Figure 5:
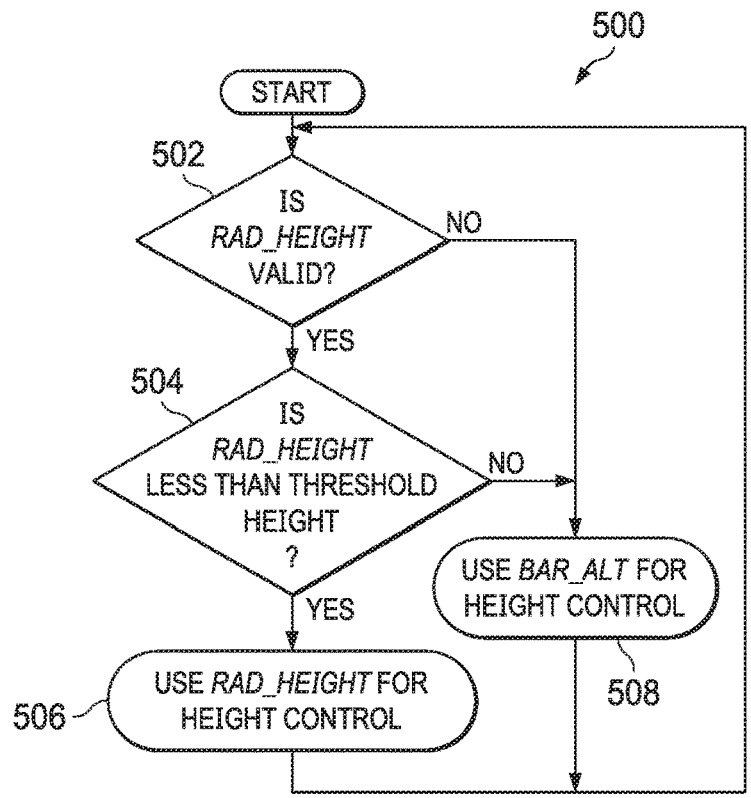
FIG. 5 illustrates a flow diagram for an embodiment height control system.

Turning to FIG. 5, an embodiment process flow 500 that may be used by selection control 420 is shown. At step 502, the selection control 420 determines if RAD_HEIGHT is valid. For example, if both radio sensors 404A-B are indicated as having failed, RAD_HEIGHT is determined to be invalid. For the case in which RAD_HEIGHT is invalid, the process proceeds to step 508, in which BAR_ALT is selected for use by the flight control system 201. If RAD_HEIGHT is valid, the process continues to step 504, in which RAD_HEIGHT is compared with the threshold height. If RAD_HEIGHT is less than or equal to the threshold height, then the flow continues to step 506, in which the RAD_HEIGHT is selected for use by the flight control system 201. If RAD_HEIGHT is greater than the threshold height, the process proceeds to step 508, and BAR_ALT is selected. In this manner, the flight control system 201 may allow automatic height control (e.g., height hold mode) at all heights, using measurements from radio sensors 404A-B when closer to ground and measurements from barometric sensors 402A-C when farther from ground.

In some embodiments, when a height hold mode is activated, the selection control 420 of height control system 400 chooses between the use of a "barometric height hold mode" using BAR_ALT or a "radio height hold mode" using RAD_HEIGHT, based on RAD_HEIGHT as determined at activation. While height hold mode is engaged, the height control system 400 may switch between barometric height hold mode or radio height hold mode based on the determination of selection control 420. As an example, if the rotorcraft is in radio height hold mode (i.e., the flight control system 201 is using RAD_HEIGHT) and both radio sensors 404A-B fail, the selection control 420 selects BAR_ALT and the height control system 400 switches the rotorcraft from radio height hold mode to barometric height hold mode. As another example, consider a situation in which the rotorcraft is in barometric height hold mode (i.e., the flight control system 201 is using BAR_ALT) at a reference height above the threshold height. If the rotorcraft flies over rising terrain or experiences a change in pressure that results in RAD_HEIGHT becoming less than the threshold height, the selection control 420 selects RAD_HEIGHT and the height control system 400 switches the rotorcraft from barometric height hold mode to radio height hold mode. In some cases, the height control system 400 may also then automatically set the reference height to the threshold height or another height. In some embodiments, the height control system 400 may notify the flight crew (e.g., via instrument panel 241) of a change between barometric height hold mode or radio height hold mode.

Figure 6:
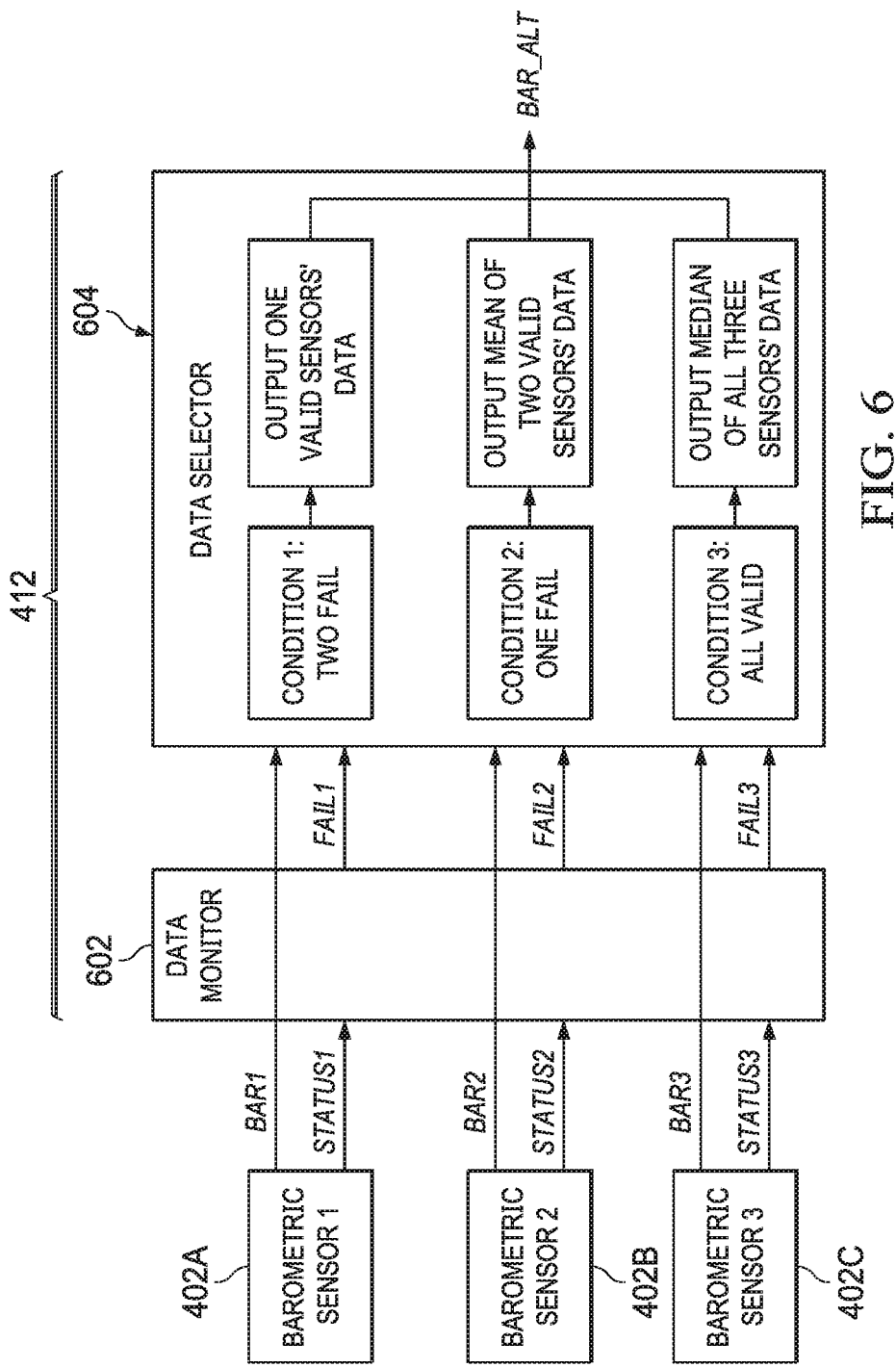
FIG. 6 illustrates a block diagram of an embodiment barometric height control system.

Turning to FIG. 6, an example barometric control 412 that may be implemented in height control system 400 is illustrated. The barometric control 412 shown in FIG. 6 includes a data monitor 602 and a data selector 604, though in some embodiments the data monitor 602 is incorporated within the data selector 604. The data monitor 602 and the data selector 604 are connected to barometric sensors 402A-C. The barometric sensors 402A-C each send their measurement data (BAR1, BAR2, BAR3) to the data monitor 602 and the data selector 604. In some embodiments, the barometric sensors 402A-C also each send sensor status data (STATUS1, STATUS2, STATUS3) to the data monitor 602. The data monitor 602 checks the measurement data and sensor status data, and sends sensor failure data (FAIL1, FAIL2, FAIL3) to the data selector 604. In some embodiments, the sensor failure data associated with each barometric sensor 402A-C includes a flag indicating failure of that sensor.

The data selector 604 receives the measurement data and the sensor failure data and, using this data, determines BAR_ALT. In some embodiments, the data selector 604 responds appropriately for all cases of single failures and all cases of multiple barometric sensor 402A-C failures unless the likelihood of the case is below a failure event threshold. For example, the data selector 604 may have responses for all cases of multiple barometric sensor 402A-C failures that are less likely than $1 \times 10^{-9}$ occurrences per flight hour. Examples of single failures include the complete loss of a single barometric sensor 402A-C or the undetected erroneous output of a single barometric sensor 402A-C. As an example, given a failure rate of a barometric sensor 402A-C as $1 \times 10^{-4}$ occurrences per flight hour, the data selector 604 has a response for the case of two barometric sensors 402A-C failing (having a likelihood of $1 \times 10^{-8}$ per flight hour) but does not have a response for the case of three barometric sensors 402A-C failing (having a likelihood of $1 \times 10^{-12}$ per flight hour). Similarly, in some cases, the data selector 604 may not have responses for cases of the erroneous output of two barometric sensors 402A-C or cases of the loss of one barometric sensor 402A-C and the erroneous output of another barometric sensor 402A-C.

Accordingly, the data selector 604 responds to each case by providing a measurement result from the barometric sensors 402A-C to the flight control system 201 in the form of BAR_ALT, with the particular BAR_ALT provided depending on the particular condition according to a selection scheme. In Condition 1, two of the three barometric sensors 402A-C are indicated as having failed. For example, the sensor failure data (e.g., FAIL1, FAIL2, FAIL3) of two of the sensors may have a failure flag set to true, indicating a failure. In this case, the measurement data (e.g., BAR1, BAR2, or BAR3) of the single valid barometric sensor 402A-C that has not failed is used for BAR_ALT. In this manner, the height indicated by BAR_ALT is set to the height as measured by the single working barometric sensor 402A-C. In Condition 2, only one of the three barometric sensors 402A-C is indicated as having failed. In this case, BAR_ALT is determined to be the mean of the measurement data of the two valid barometric sensors 402A-C. In this manner, the height indicated by BAR_ALT is set to the average of the heights as measured by the two valid barometric sensors 402A-C. In Condition 3, all three of the barometric sensors 402A-C are indicated as valid. In this case, BAR_ALT is determined to be the median of the measurement data of the three barometric sensors 402A-C. In this manner, the height indicated by BAR_ALT is set to the median of the heights as measured by the three barometric sensors 402A-C. In other embodiments, the data selector 604 may have responses for other cases, or BAR_ALT may be determined from the measurement data using other techniques. By responding appropriately to different cases with regard to barometric sensors 402A-C, the data selector 604 is able to provide a more accurate and more reliable BAR_ALT to the flight control system 201.

Figure 7:
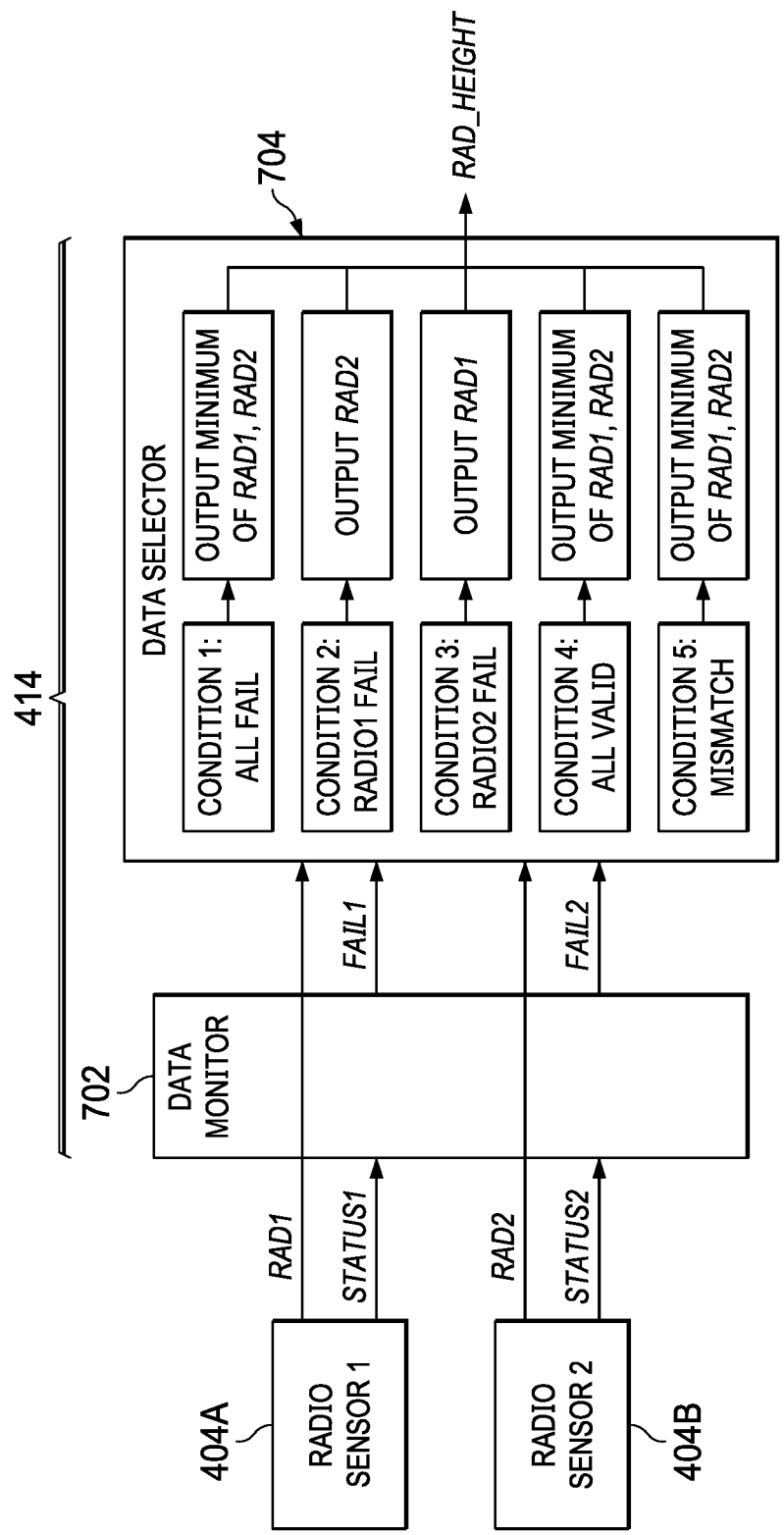
FIG. 7 illustrates a block diagram of an embodiment radio height control system.

Turning to FIG. 7, an example radio control 414 that may be implemented in height control system 400 is illustrated. The radio control 414 shown in FIG. 7 includes a data monitor 702 and a data selector 704, though in some embodiments the data monitor 702 is incorporated within the data selector 704. The data monitor 702 and the data selector 704 are connected to radio sensors 402A-B. The radio sensors 404A-B each send their measurement data (RAD1, RAD2) to the data monitor 702 and the data selector 704. In some embodiments, the radio sensors 404A-B also each send sensor status data (STATUS1, STATUS2) to the data monitor 702. The data monitor 702 checks the measurement data and sensor status data, and sends sensor failure data (FAIL1, FAIL2) to the data selector 704. In some embodiments, the sensor failure data associated with each radio sensor 404A-B includes a flag indicating failure of that sensor.

The data selector 704 receives the measurement data and the sensor failure data and, using this data, determines RAD_HEIGHT. As the height control system 400 includes two radio sensors 404A-B, the data selector 704 may be configured to reduce resultant transients if one of the two radio sensors 404A-B malfunctions. In some cases, determining RAD_HEIGHT from the mean of the measurement data may result in the flight control system 201 generating a transient if one of the two radio sensors 404A-B has produced erroneous data. Therefore, to allow full envelope height control, the data selector 704 uses a modified selection scheme such as that described in FIGS. 7-8. In this example selection scheme, the minimum of the measurement data RAD1 or RAD2 is selected and used for RAD_HEIGHT in some conditions rather than the average. While the selection scheme described below utilizes the height measured by a single one of radio sensors 404A-B, the height measured by both of radio sensors 404A-B may be displayed to the flight crew (e.g., on instrument panel 241).

Accordingly, the data selector 704 provides a measurement result from the radio sensors 404A-B to the flight control system 201 in the form of RAD_HEIGHT according to a selection scheme. The example selection scheme shown in FIGS. 7-8 includes five cases corresponding to five different conditions, though other selection schemes with more or fewer cases may be used in other embodiments. In Condition 1, both of the radio sensors 404A-B are indicated as having failed. For example, the sensor failure data (e.g., FAIL1, FAIL2) of both sensors may have a failure flag set to true, indicating a failure. In this case, the minimum of the measurement data (i.e., the minimum value of RAD1 or RAD2) is used for RAD_HEIGHT. In this manner, the height indicated by RAD_HEIGHT is set to the lesser of the heights measured by the radio sensors 404A-B. In addition, upon loss of both radio sensors 404A-B, the selection control 420 selects BAR_ALT. For example, if the rotorcraft is in radio height hold mode, the height control system 201 switches to barometric height hold mode and sets the reference height to the current BAR_ALT. The transition to barometric height hold mode may be annunciated to the flight crew. In some cases, a failure of both radio sensors 404A-B may result in the pilot disengaging height hold mode or limiting its use to greater heights. However, due to the selection scheme described, a failure of both radio sensors 404A-B is less likely to result in a transient or an unsafe flight condition.

In Condition 2 and Condition 3, only one of the two radio sensors 404A-B is indicated as having failed. In each of Condition 2 and Condition 3, RAD_HEIGHT is set to be the measurement data of the one valid radio sensor. For example, in Case 2, radio sensor 404A has failed, and so RAD_HEIGHT is set to the height measured by radio sensor 404B. In each of Condition 2 or Condition 3, the flight crew may be notified of the associated failed radio sensor 404A-B.

In this manner, if one radio sensor 404A-B fails completely (e.g., the failing sensor provides no output or provides an output that is flagged invalid), the data selector 420 selects the other, valid sensor. In some cases, the flight crew is alerted to the failure, for example via instrument panel 129. With one radio sensor having failed, protection against a subsequent erroneous output from the remaining radio sensor is no longer guaranteed. In some cases, the flight crew may then be restricted to the use of only the barometric height hold mode, which may have a prohibition against using the mode below a specified MUH. In this example selection scheme, simultaneous failures of both radio sensors that involve both radio sensors having erroneous measurement data or the loss of one radio sensor and erroneous measurement data from the other radio sensor are not considered. In some cases, the probability of either occurrence is small, such as less than $1 \times 10^{-9}$ per flight hour.

In Condition 4, both of the radio sensors 404A-B are indicated as valid. In this case, the minimum of the measurement data (i.e., the minimum value of RAD1 or RAD2) is used for RAD_HEIGHT. In this manner, the height indicated by RAD_HEIGHT is set to the lesser of the heights measured by the radio sensors 404A-B.

In Condition 5, both of the radio sensors 404A-B are indicated as valid, but a difference between the measured heights of each radio sensor 404A-B is above a threshold value. In this case, the minimum of the measurement data (i.e., the minimum value of RAD1 or RAD2) is used for RAD_HEIGHT. In this manner, in the case of a large difference between the two values of height as measured by the radio sensors 404A-B, the height indicated by RAD_HEIGHT is set to the lesser of the two height values. As an example, consider a rotorcraft in radio height hold with a reference height of 10 feet. If one radio sensor 404A-B suddenly and erroneously reports a height of 20 feet, data selector 704 sets RAD_HEIGHT to 10 feet. Thus, the rotorcraft continues hovering at 10 feet above the ground, and no transient or erroneous height change occurs. As another example, if one radio sensor 404A-B suddenly and erroneously reports 0 feet, the data selector 704 sets RAD_HEIGHT to 0 feet, and the flight control system 201 maintains height hold mode at the reference height of 10 feet by initiating a climb until the measured height is 10 feet. Thus, the selection scheme helps the rotorcraft maintain a safe height above the ground in the case of a single erroneous radio sensor.

Figure 8:
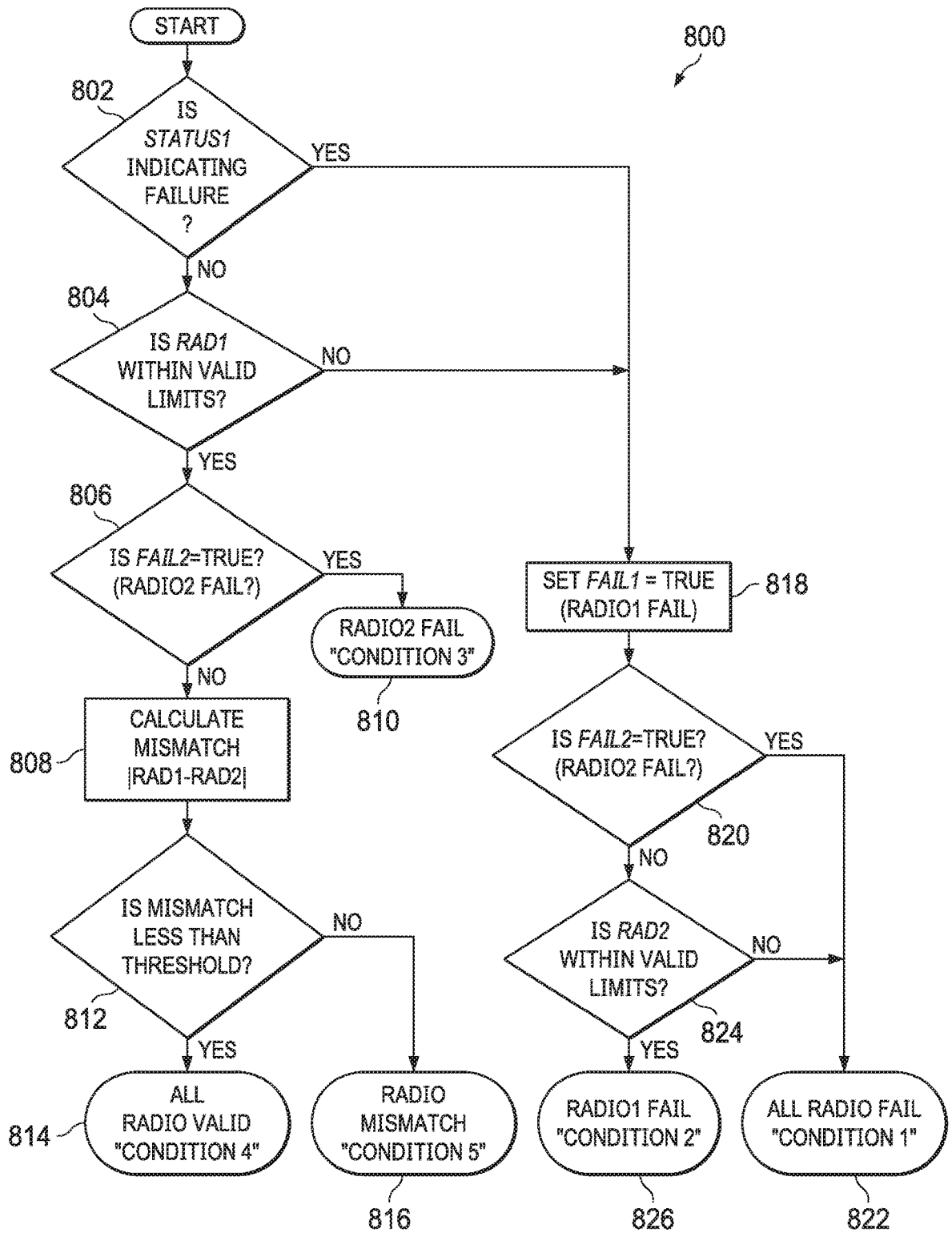
FIG. 8 illustrates a flow diagram of an embodiment selection scheme for radio height control

Turning to FIG. 8, the selection scheme described above with regard to the radio control 414 is shown as an embodiment process flow 800. In other embodiments, the selection scheme may be implemented using a different process flow than process flow 800. For example, the steps may be performed in a different sequence, different steps may be used, or more or fewer steps may be used. Beginning with step 802, radio sensor 404A is checked for an indication of failure. For example, the data monitor 702 may receive status data STATUS1 from radio sensor 404A and determine if it indicates a failure. If a failure is indicated, the process continues to step 818 in which the data monitor 702 sets failure flag FAIL1 to true. If no failure is indicated, the process continues to step 804. In step 804, the measurement data RAD1 from radio sensor 404A is checked whether it is within valid limits. In some cases, the limits may include a lower limit or an upper limit. For example, if RAD1 indicates a height that is more than 10 feet below ground or more than 2600 feet above ground, the height measurement is considered erroneous. Other limits may be used. If RAD1 is not within valid limits, the process continues to step 818. If RAD1 is valid, the process continues to step 806, in which radio sensor 404B is checked for an indication of failure. For example, a failure of radio sensor 404B may be indicated if failure flag FAIL2 has been set to true. If a failure is indicated, the process continues to step 810 in which the selection scheme has determined the radio sensors 404A-B to be in Condition 3 as described above with regard to FIG. 7. If radio sensor 404B does not indicate failure, the process continues to step 808.

In step 808, the mismatch between RAD1 and RAD2 is determined by taking the absolute value of the difference between RAD1 and RAD2. In step 812, the mismatch is compared with a mismatch threshold. If the mismatch is less than the mismatch threshold, the process continues to step 814, in which the selection scheme has determined both the radio sensors 404A-B to be valid, as in Condition 4 as described above with regard to FIG. 7. If the mismatch is greater than the mismatch threshold, the process continues to step 816, in which the selection scheme has determined that the radio sensors 404A-B have unacceptable mismatch, as in Condition 5 as described above with regard to FIG. 7.

Returning to step 818 which may follow from step 802 or step 804, it has been determined that radio sensor 404A has failed. The process continues to step 820, in which radio sensor 404B is also checked for an indication of failure. If a failure of radio sensor 404B is indicated, both radio sensors 404A-B have failed, and the process continues to step 822 in which the selection scheme has determined the radio sensors 404A-B to be in Condition 1 as described above with regard to FIG. 7. If radio sensor 404B does not indicate failure, the process continues to step 824, in which the measurement data RAD2 from radio sensor 404B is checked whether it is within valid limits. If RAD2 is not within valid limits, the process continues to step 822, corresponding to Condition 1, which is a failure of both radio sensors 404A-B. If RAD2 is within valid limits, then the process continues to step 826 in which the selection scheme has determined the radio sensors 404A-B to be in Condition 2 as described above with regard to FIG. 7.

Figure 9:
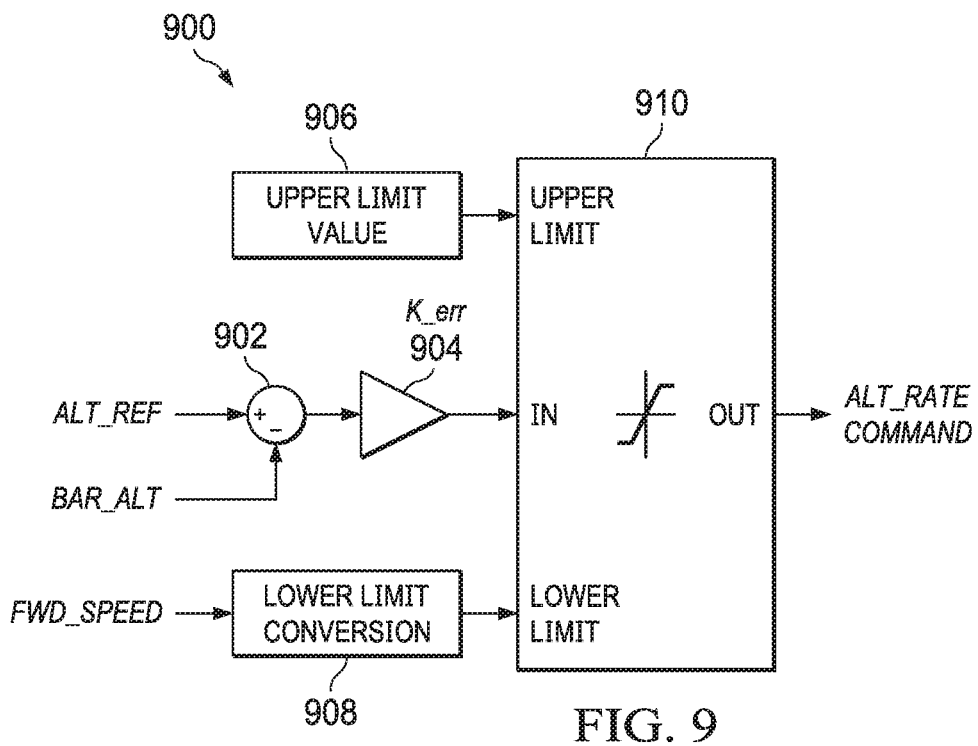
FIG. 9 illustrates a block diagram of an embodiment barometric height control system.

FIG. 9 illustrates a barometric height hold system 900 that may be implemented in flight control system 201 according to an embodiment. The barometric height hold system 900 may receive a reference height ALT_REF and use BAR_ALT to generate an appropriate altitude rate ALT_RATE COMMAND that may be used by the flight control system 201 to bring the aircraft to ALT_REF or used to hold the rotorcraft at ALT_REF while in barometric height hold mode. The barometric height hold system 900 may produce a command (e.g., ALT_RATE COMMAND) proportional to the error between the specified target value (e.g., ALT_REF) and the actual aircraft state (e.g., BAR_ALT). The value of ALT_RATE COMMAND dictates the vertical rate the aircraft achieves in returning to ALT_REF.

The comparator 902 determines a difference between ALT_REF and BAR_ALT. For example, the absolute value (or magnitude) of the difference between ALT_REF and BAR_ALT is determined, as well as the sign (or direction) of the difference (e.g., positive indicating increasing height to achieve the desired reference height, negative indicating decreasing height to achieve the desired reference height). The output of the comparator 902 is provided to gain stage 904, which generates an appropriate altitude rate based on the comparator 902 output and a gain K_err.

In some embodiments, the barometric height hold system 900 may use rate limiter 910 to limit the descent rate the appropriate height hold loops or vertical speed loops may command in order to provide increased safety. For example, an asymmetric limiter may be used to limit the descent rate that can be commanded to a value of altitude rate that is within the structural limits of the airframe, rotor, landing gear, etc. In some embodiments, a larger magnitude altitude rate command is allowed when climbing to provide the ability of the aircraft to climb faster than terrain, for example, during low altitude forward flight at low ground speeds. In this manner, the output from gain stage 904 is provided to rate limiter 910 to provide an altitude rate within acceptable limits. The output from rate limiter 910, ALT_RATE COMMAND, is provided to the flight control system 201, and the flight control system 201 adjusts the flight characteristics of the aircraft to achieve the appropriate ascent rate or descent rate to reach ALT_REF.

An upper limit of altitude rate may be provided by an upper limit value 906. The upper limit may be a constant (e.g., 2500 ft/min or another limit) or may be determined in another manner. In an embodiment, a lower limit of altitude rate is determined from an indication of the forward velocity of the aircraft FWD_SPEED, which may be provided by appropriate aircraft sensors 207. A lower limit conversion 908 may use FWD_SPEED to determine the lower limit of the rate limiter 910. For example, the lower limit conversion 908 may provide a minimum value for a lower limit if FWD_SPEED is below a lower threshold speed or provide a maximum value for a lower limit if FWD_SPEED is above an upper threshold speed. For values of FWD_SPEED between the lower threshold speed and the upper threshold speed, the lower limit conversion 908 may provide a lower limit based on a linear interpolation. For example, for a FWD_SPEED below 35 knots, the lower limit conversion 908 may provide a lower limit of −300 ft/min, and for a FWD_SPEED above 140 knots, the lower limit conversion 908 may provide a lower limit of −2000 ft/min. For a FWD_SPEED between 35 knots and 140 knots, the lower limit conversion 908 may provide a lower limit having a value interpolated between −300 ft/min and −2000 ft/min. Other values and other techniques for determining an upper limit or a lower limit may be used in other embodiments.

Figure 10:
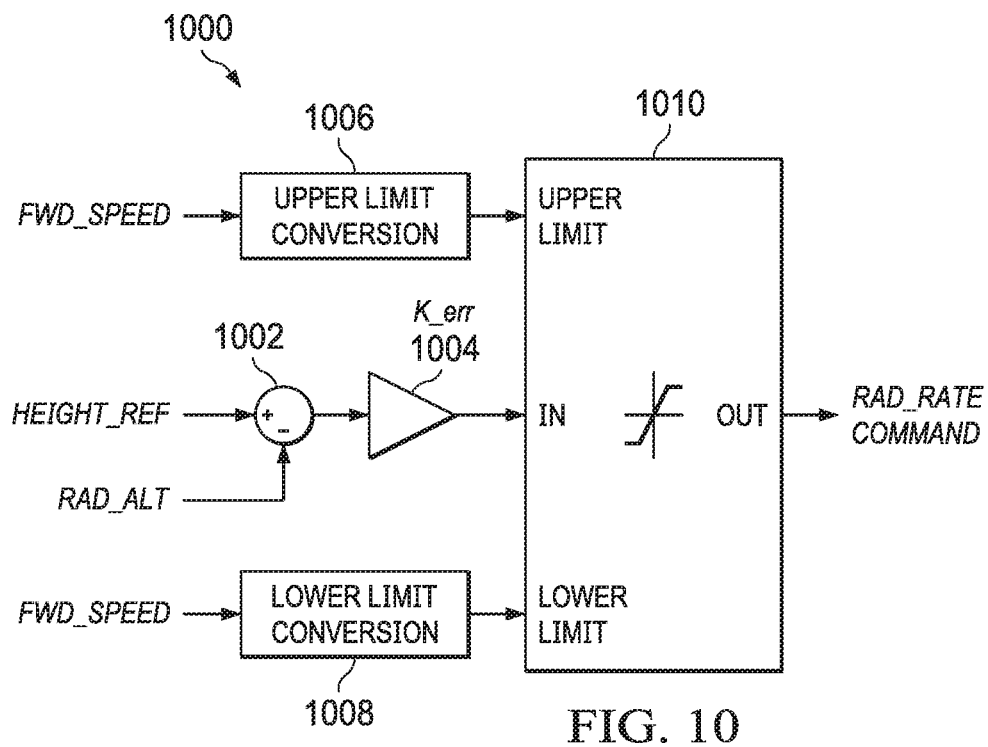
FIG. 10 illustrates a block diagram of an embodiment radio height control system.

FIG. 10 illustrates a radio height hold system 1000 that may be implemented in flight control system 201 according to an embodiment. The radio height hold system 1000 may receive a reference height HEIGHT_REF and use RAD_ALT to generate an appropriate altitude rate RAD_RATE COMMAND that may be used by the flight control system 201 to bring the aircraft to RAD_REF or used to hold the rotorcraft at RAD_REF while in radio height hold mode. The radio height hold system 1000 may produce a command (e.g., RAD_RATE COMMAND) proportional to the error between the specified target value (e.g., HEIGHT_REF) and the actual aircraft state (e.g., RAD_ALT). The value of RAD_RATE COMMAND dictates the vertical rate the aircraft achieves in returning to HEIGHT_REF.

The comparator 1002 determines a difference between HEIGHT_REF and RAD_ALT. For example, the absolute value (or magnitude) of the difference between HEIGHT_REF and RAD_ALT is determined, as well as the sign (or direction) of the difference. The output of the comparator 1002 is provided to gain stage 1004, which generates an appropriate altitude rate based on the comparator 1002 output and a gain K_err. The output from gain stage 1004 is provided to a rate limiter 1010 to provide an altitude rate within acceptable limits. The output from rate limiter 1010, RAD_RATE COMMAND, is provided to the flight control system 201, and the flight control system 201 adjusts the flight characteristics of the aircraft to achieve the appropriate ascent rate or descent rate to reach HEIGHT_REF.

In some embodiments, the rate limiter 1010 may have the upper limit and the upper limit determined from a forward velocity of the aircraft FWD_SPEED. The upper limit may be provided by an upper limit conversion 1006, which may be based on FWD_SPEED and an interpolation between a minimum value and a maximum value. For example, the minimum value may be 300 ft/min at a FWD_SPEED of below 35 knots, and the maximum value may be 1500 ft/min at a FWD_SPEED of above 100 knots. The lower limit may be provided by a lower limit conversion 1006, which may be based on FWD_SPEED and an interpolation between a minimum value and a maximum value. For example, the minimum value may be −100 ft/min at a FWD_SPEED of below 35 knots, and the maximum value may be −300 ft/min at a FWD_SPEED of above 100 knots. In this manner, the descent rate may be limited when the flight control system 201 uses radio sensors 404A-B to determine aircraft height. Other values and other techniques for determining an upper limit or a lower limit may be used in other embodiments.

In some cases, the minimum value selection logic and limited descent rate described herein for a height control system 400 may improve flight safety during a step change or mismatch in sensed height. For example, in radio height hold mode, the selection logic described in FIGS. 7-8 and the limited descent rate described in FIG. 10 may protect against driving a rotorcraft down into a structure. For example, the height control system 400 may protect a rotorcraft when performing a slow transition away from an elevated helipad. As an illustrative example, if the rotorcraft in radio height hold mode is hovering at a reference height (HEIGHT_REF) of 10 feet above a helipad that is 40 feet above the ground and then translates away from the helipad, the sensed radio height experiences a step change from 10 feet to 50 feet. Since the reference height is 10 feet, the radio height hold system 1000 provides a RAD_RATE COMMAND to the fight control system 201 that directs the rotorcraft to descend in order to reach the reference height of 10 feet. However, the selection logic as described in FIGS. 7-8 determines that a mismatch exists between RAD1 and RAD2, and accordingly the height hold system 400 uses the minimum of RAD1 and RAD2. This ensures that the radio height hold system 1000 does not respond to the step change until both radio sensors 404A-B report the new height of 50 feet (within the mismatch threshold). Since the radio sensors 404A-B may be separated by some distance on a rotorcraft, this also ensures that more of the rotorcraft is no longer over the helipad before the height control system 400 responds. Additionally, the limited descent rate determined by lower limit conversion 1008 may provide a rotorcraft descent rate that is slow enough that the height control system 400 or the pilot has adequate time to respond safely.

Figure 11:
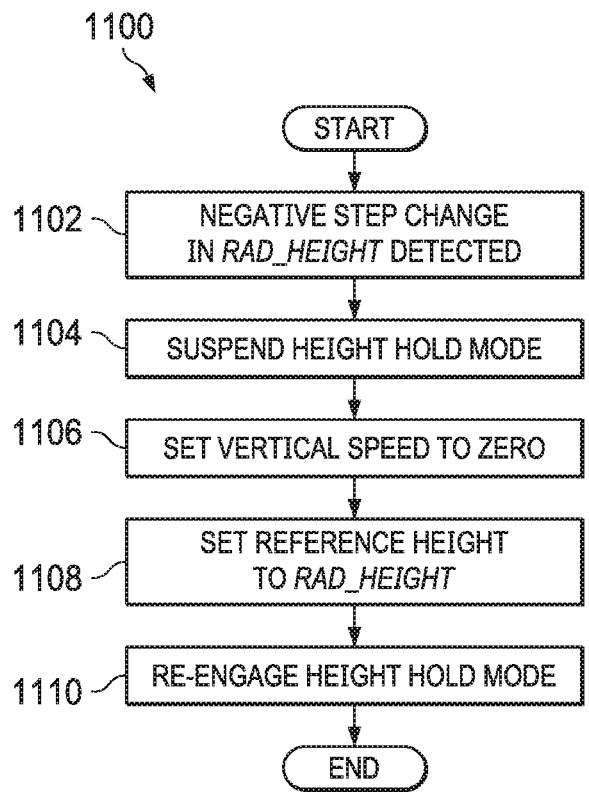
FIG. 11 illustrates a flow diagram for an embodiment radio height control system.

In some embodiments, the height control system 400 may include additional logic or techniques to improve rotorcraft safety. For example, FIG. 11 shows a process flow 1100 for responding to a step change in RAD_HEIGHT when in radio height hold mode. At 1102, a negative step change in RAD_HEIGHT is detected. In some cases, a rapid decrease in RAD_HEIGHT may be detected in addition to an abrupt step change. At 1104, in response to the step change detection, the radio height hold mode is suspended. The flight crew may be notified of the suspension of radio height hold mode. At 1106, the vertical speed of the aircraft is set to zero, and the flight control system 201 responds accordingly to maintain a vertical speed. At 1108, the reference height HEIGHT_REF is set to the currently sensed RAD- _HEIGHT. At 1110, the radio height hold mode is re-engaged at zero vertical speed and using the new HEIGHT_REF set at 1108. In some embodiments, the height control system 400 enforces a time delay after 1108 before re-engaging the radio height hold mode at 1110. In this manner, the height control system 400 allows the height control system 400 or the pilot to respond to sudden changes in terrain. The process flow 1100 and similar logic may reduce the chance that the aircraft collides with uneven terrain or responds unsafely to uneven terrain when in radio height hold mode.

Figure 12:
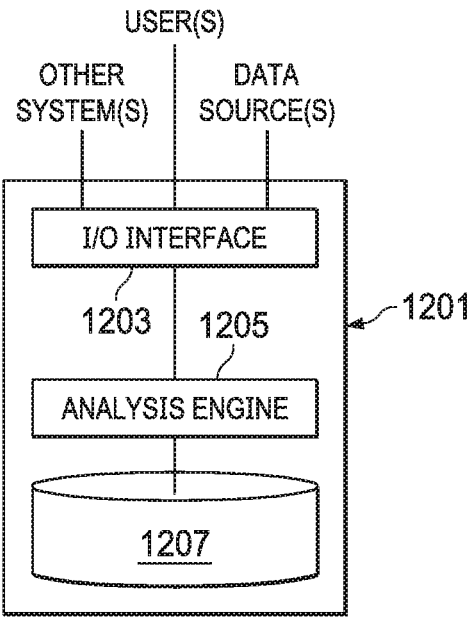
FIG. 12 illustrates a computer system that may be used to implement embodiment control algorithms.

FIG. 12 illustrates a computer system 1201. The computer system 1201 can be configured for performing one or more functions with regard to the operation of the flight control system 201 including height control system 400, as described herein. Further, any processing and analysis can be partly or fully performed by the computer system 1201. The computer system 1201 can be partly or fully integrated with other aircraft computer systems or can be partly or fully removed from the rotorcraft.

The computer system 1201 can include an input/output (I/O) interface 1203, an analysis engine 1205, and a database 1207. Alternative embodiments can combine or distribute the I/O interface 1203, the analysis engine 1205, and the database 1207, as desired. Embodiments of the computer system 1201 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 1203 can provide a communication link between external users, systems, and data sources and components of the computer system 1201. The I/O interface 1203 can be configured for allowing one or more users to input information to the computer system 1201 via any known input device. Examples can include a keyboard, mouse, touch screen, and/or any other desired input device. The I/O interface 1203 can be configured for allowing one or more users to receive information output from the computer system 1201 via any known output device. Examples can include a display monitor, a printer, cockpit display, and/or any other desired output device. The I/O interface 1203 can be configured for allowing other systems to communicate with the computer system 1201. For example, the I/O interface 1203 can allow one or more remote computer(s) to access information, input information, and/or remotely instruct the computer system 1201 to perform one or more of the tasks described herein. The I/O interface 1203 can be configured for allowing communication with one or more remote data sources. For example, the I/O interface 1203 can allow one or more remote data source(s) to access information, input information, and/or remotely instruct the computer system 1201 to perform one or more of the tasks described herein.

The database 1207 provides persistent data storage for the computer system 1201. Although the term "database" is primarily used, a memory or other suitable data storage arrangement may provide the functionality of the database 1207. In alternative embodiments, the database 1207 can be integral to or separate from the computer system 1201 and can operate on one or more computers. The database 1207 preferably provides non-volatile data storage for any information suitable to support the operation of the flight control system 201, including various types of data discussed further herein. The analysis engine 1205 can include various combinations of one or more processors, memories, and software components.

In accordance with an embodiment, a method of operating a rotorcraft includes receiving multiple first height data signals from multiple first height sensors on the rotorcraft, wherein the first height sensors measure height using a first technique, receiving multiple second height data signals from multiple second height sensors on the rotorcraft, wherein the second height sensors measure height using a second technique that is different than the first technique, determining a first height signal from the multiple first height data signals based on a selection scheme, determining a second height signal from the multiple second height data signals, selecting the first height signal or the second height signal to determine a selected height signal, and generating a flight control signal and controlling operation of the rotorcraft according to the flight control signal, the flight control signal based on the selected height signal. In an embodiment, generating a flight control signal includes determining a difference between the selected height signal and a reference height, determining an altitude rate command based on the difference, and transmitting the altitude rate command to a flight control device to control the flight control device. In an embodiment, the first height sensors are radio height sensors and the second height sensors are barometric height sensors. In an embodiment, the selection scheme includes selecting the first height signal based on the smallest height indicated by the multiple first height data signals. In an embodiment, the selection scheme includes determining a difference between a first signal of the multiple first height data signals and a second signal of the multiple first height data signals. In an embodiment, selecting the first height signal or the second height signal includes comparing the first height signal with a height threshold. In an embodiment, selecting the first height signal or the second height signal includes determining whether any of the multiple first height sensors are in a failure state. In an embodiment, determining a second height signal includes determining a median value of the multiple second height data signals.

In accordance with an embodiment, a flight control system for a rotorcraft includes multiple radio height sensors, multiple barometric altitude sensors, and a flight control computer (FCC) operable to control one or more flight control devices of the rotorcraft. The FCC includes a processor and a non-transitory computer-readable storage medium storing a program to be executed by the processor. The program includes instructions for providing control of the rotorcraft, the instructions for providing control of the rotorcraft including instructions for receiving measured height data from the multiple radio height sensors, receiving measured altitude data from the multiple barometric altitude sensors, and controlling one or more flight control elements of the rotorcraft and maintaining a vertical position of the rotorcraft, wherein the controlling is based on the measured height data when the measured height data indicates a rotorcraft height at or below a threshold value. In an embodiment, the executable program further includes instructions for controlling one or more flight control elements of the rotorcraft and maintaining a vertical position of the rotorcraft, wherein the controlling is based on the measured altitude data when the measured height data indicates a rotorcraft height above the threshold value. In an embodiment, the executable program further includes instructions for controlling one or more flight control elements of the rotorcraft and maintaining a vertical position of the rotorcraft, wherein the controlling is based on the smallest measured height of the measured height data. In an embodiment, the executable program further includes instructions for determining a limit on the descent rate allowed when maintaining a vertical position of the rotorcraft. In an embodiment, the descent rate limit is based on a forward velocity of the rotorcraft. In an embodiment, the executable program further includes instructions for determining a limit on the ascent rate allowed when maintaining a vertical position of the rotorcraft. In an embodiment, the executable program further includes instructions for controlling one or more flight control elements of the rotorcraft and maintaining a vertical position of the rotorcraft, wherein the controlling is based on the measured altitude data.

In accordance with an embodiment, a rotorcraft includes a flight control computer (FCC), a first radio height sensor coupled to the FCC, a second radio height sensor coupled to the FCC, and one or more flight control devices coupled to the FCC and operable to control a flight parameter of the rotorcraft in response to a flight control device control signal received from the FCC, wherein the FCC is operable to receive a first indication of height from the first radio height sensor and a second indication of height from the second radio height sensor, to generate the flight control device control signal according to the lesser of the two heights indicated by the first indication of height and the second indication of height, and to send the flight control device control signal to the one or more flight control devices. In an embodiment, the FCC is further operable to determine if one of the first radio sensor or the second radio sensor has failed, and to generate the flight control device control signal according to the indication of height received from the other of the first radio sensor or the second radio sensor. In an embodiment, the rotorcraft further includes multiple barometric height sensors coupled to the FCC. In an embodiment, the FCC is further operable to determine if both of the first radio sensor and the second radio sensor have failed, and to generate the flight control device control signal according to an indication of height received from the plurality of barometric height sensors. In an embodiment, the FCC is further operable to limit a rate of ascent or a rate of descent associated with the flight control device control signal.

Advantages of embodiments include the ability for a rotorcraft to safely maintain a height hold mode for all heights. The logic associated with the height hold mode allows for radio height sensors to be used at lower heights and barometric sensors to be used at greater heights for determining the height of the rotorcraft. This allows a height hold mode to be used without limitations (e.g., a minimum use height). The system and method described herein may also allow "outer loop" modes such as hover modes (e.g., position hold or zero speed hold) or height hold modes for the full flight envelope (i.e., at all altitudes).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For example, while the embodiments described herein use radio sensors as height sensors and barometric sensors as altitude sensors, other types of height sensors/altitude sensors or combinations of types of height sensors/altitude sensors may be used. For example, in some embodiments, height sensors may include light-based sensors (e.g., laser-based sensors, optical sensors, etc.), sound-based sensors (e.g., ultrasonic sensors, echolocation-based sensors, etc.), other radar-based sensors, GPS-based sensors (e.g., differential GPS sensors), other radio-frequency-based sensors, or other types of height sensors. In some embodiments, altitude sensors may include GPS-based sensors (e.g., differential GPS sensors, Satellite-Based Augmentation System (SBAS) sensors, etc.), other atmospheric pressure-based sensors, or other types of altitude sensors. It is therefore intended that the appended claims encompass any such modifications or embodiments.

What is claimed is:

1. A method of operating a rotorcraft, the method comprising:
    receiving, by a flight control computer (FCC) of the rotorcraft, a first height data signal from a first height sensor on the rotorcraft and a second height data signal from a second height sensor on the rotorcraft, wherein the first height sensor and the second height sensor measure a height of the rotorcraft using a first technique;
    receiving, by the FCC, a third height data signal from a third height sensor on the rotorcraft, a fourth height data signal from a fourth height sensor on the rotorcraft, and a fifth height data signal from a fifth height sensor on the rotorcraft, wherein the third height sensor, the fourth height sensor, and the fifth height sensor measure a height of the rotorcraft using a second technique that is different than the first technique;
    selecting, by the FCC, a first height signal from the first height data signal and the second height data signal based on a first selection scheme, the first height signal corresponding to one of the first height data signal or the second height data signal, wherein the first selection scheme comprises selecting which of the first height data signal or the second height data signal indicates the smaller height of the rotorcraft;
    determining, by the FCC, a second height signal from the third height data signal, the fourth height data signal, and the fifth height data signal based on a second selection scheme that is different than the first selection scheme;
    selecting, by the FCC, either the first height signal or the second height signal to determine a selected height signal, the selecting based on a threshold height associated with an automatic height hold mode of the rotorcraft;
    generating, by the FCC, a flight control signal for the automatic height hold mode of the rotorcraft, wherein the flight control signal is based on the selected height signal; and
    transmitting, by the FCC, the flight control signal to a flight control device of the rotorcraft to control a flight characteristic of the rotorcraft during a flight operation of the rotorcraft, wherein the flight characteristic is controlled to automatically achieve a reference height for the rotorcraft that is associated with the automatic height hold mode of the rotorcraft.

2. The method of claim 1, wherein generating a flight control signal comprises:
determining a difference between the selected height signal and a reference height;
determining an altitude rate command based on the difference; and
transmitting the altitude rate command to a flight control device to control the flight control device.

3. The method of claim 1, wherein the first height sensor and the second height sensor are radio height sensors, and wherein the third height sensor, the fourth height sensor, and the fifth height sensor are barometric height sensors.

4. The method of claim 1, wherein the first selection scheme comprises comparing a difference between the first height data signal and the second height data signal with a mismatch threshold and determining that there is a mismatch between the first height data signal and the second height data signal when the difference is greater than the mismatch threshold.

5. The method of claim 1, wherein selecting the first height signal or the second height signal comprises comparing the first height signal with a height threshold.

6. The method of claim 1, wherein selecting the first height signal or the second height signal is based on determining that at least one of the first height sensor and/or the second height sensor is in a failure state.

7. The method of claim 1, wherein determining the second height signal comprises determining a median value of the third height data signal, the fourth height data signal, and the fifth height data signal.

8. A rotorcraft comprising:
a flight control computer (FCC);
a first radio height sensor coupled to the FCC;
a second radio height sensor coupled to the FCC;
a plurality of barometric height sensors coupled to the FCC, wherein the plurality of barometric height sensors comprises at least three barometric height sensors; and
one or more flight control devices coupled to the FCC and operable to control a flight parameter of the rotorcraft during flight in response to flight control device control signals received from the FCC;
wherein, during flight of the rotorcraft, the FCC is operable to:
automatically generate flight control device signals and send the flight control device signals to the one or more flight control devices to achieve a first reference height for the rotorcraft according to a first automatic height control mode;
receive a first indication of height from the first radio height sensor and a second indication of height from the second radio height sensor;
receive a plurality of indications of height from the plurality of barometric height sensors;
generate an indication of altitude from the plurality of indications of height from the plurality of barometric height sensors;
compare a threshold height to the indication of altitude and to the lesser of the two heights indicated by the first indication of height and the second indication of height; and
based on the comparing, automatically generate flight control device signals and send the flight control device control signals to the one or more flight control devices to achieve a second reference height for the rotorcraft according to a second automatic height control mode, wherein the first reference height is different than the second reference height and the first automatic height control mode is different than the second automatic height control mode.

9. A flight control system for a rotorcraft comprising:
a duplex system of radio height sensors, wherein each radio height sensor is configured to measure a height of the rotorcraft, wherein the height corresponds to a distance above a respective surface beneath the respective radio height sensor;
a triplex system of barometric altitude sensors, wherein each barometric altitude sensor is configured to measure an altitude of the rotorcraft, wherein the altitude corresponds to a distance above sea level; and
a flight control computer (FCC) operable to control one or more flight control devices of the rotorcraft, comprising:
a processor; and
a non-transitory computer-readable storage medium storing a program to be executed by the processor, the program including instructions for providing control of the rotorcraft, the instructions for providing control of the rotorcraft including instructions for:
receiving measured height data from each of the radio height sensors, each measured height data corresponding to the height measured by a respective radio height sensor;
determining a selected height using a duplex selection technique, comprising selecting one measured height data that corresponds to the lowest height measured by the radio height sensors;
receiving measured altitude data from each of the barometric altitude sensors, each measured altitude data corresponding to the altitude measured by a respective barometric altitude sensor;
generating a selected altitude from the measured altitude data from the plurality of barometric altitude sensors using a triplex selection technique that is different from the duplex selection technique; and
controlling one or more flight control elements of the rotorcraft to automatically achieve and maintain flight of the rotorcraft at a reference height, wherein the controlling is based on either the selected height or the selected altitude, wherein the controlling is based on the selected height when the selected height is at or below a threshold height.

10. The flight control system of claim 9, wherein the executable program further includes instructions for controlling one or more flight control elements of the rotorcraft to automatically achieve and maintain flight of the rotorcraft at the reference height, wherein the controlling is based on the selected altitude when the selected height is above the threshold height.

11. The flight control system of claim 9, wherein the executable program further includes instructions for determining a limit on a descent rate allowed when achieving and maintaining the reference height of the rotorcraft during flight.

12. The flight control system of claim 11, wherein the descent rate limit is based on a forward velocity of the rotorcraft.

13. The flight control system of claim 9, wherein the executable program further includes instructions for determining a limit on an ascent rate allowed when achieving and maintaining the reference height of the rotorcraft during flight.

14. The flight control system of claim 9, wherein the executable program further includes instructions for generating the selected altitude from the measured altitude data from the plurality of barometric altitude sensors by calculating a mean of the altitude data from two of the plurality of barometric altitude sensors or by calculating a median of the altitude data from three of the plurality of barometric altitude sensors.

15. The rotorcraft of claim 8, wherein the flight control device signals generated according to the first automatic height control mode are generated based on the indication of altitude.

16. The rotorcraft of claim 15, wherein the FCC is further operable to determine if one of the first radio sensor or the second radio sensor has failed, and, in response to determining that one of the first radio sensor or the second radio sensor has failed, to automatically generate flight control device control signals according to the indication of height received from the other of the first radio sensor or the second radio sensor.

17. The rotorcraft of claim 15, wherein the FCC is further operable to determine if both of the first radio sensor and the second radio sensor have failed, and, in response to determining that the first radio sensor and the second radio sensor have failed, to automatically generate flight control device control signals according to an indication of height received from the plurality of barometric height sensors.

18. The rotorcraft of claim 15, wherein the FCC is further operable to limit a rate of ascent or a rate of descent associated with the flight control device control signal.

19. The rotorcraft of claim 15, wherein the second reference height is equal to the threshold height.

20. The method of claim 4, wherein the first selection scheme further comprises setting the reference height to the minimum of the first height data signal and the second height data signal when the mismatch exists.

* * * * *